Feb. 15, 1966  J. J. GILBERT  3,234,833
AUTOMATIC MACHINES FOR CUTTING OFF AND COLLECTING
PARTS OF MAGAZINES
Filed Aug. 17, 1964  3 Sheets-Sheet 2
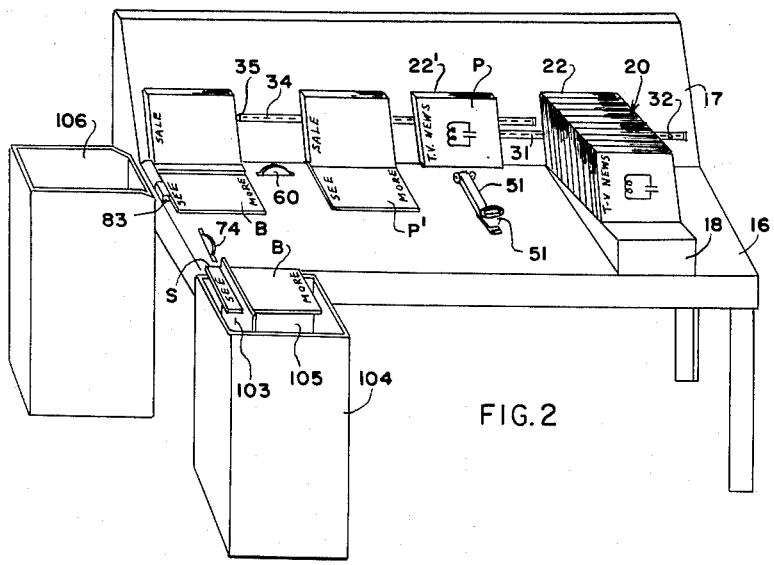
FIG. 2
FIG. 4
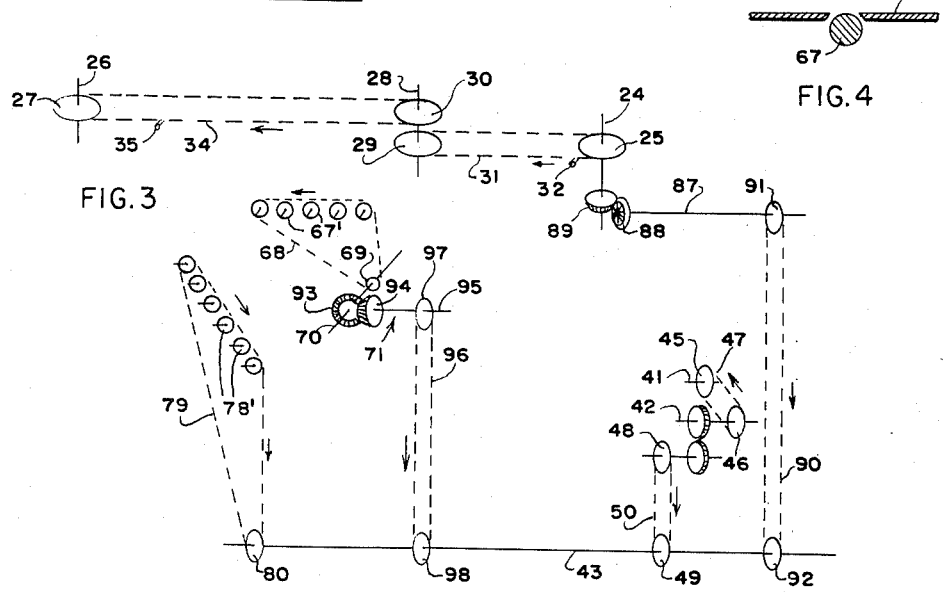
FIG. 3
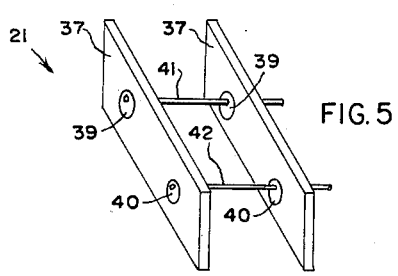
FIG. 5
INVENTOR,
Jack J. Gilbert,
BY
ATTORNEY.

United States Patent Office

3,234,833
Patented Feb. 15, 1966

3,234,833
AUTOMATIC MACHINES FOR CUTTING OFF AND COLLECTING PARTS OF MAGAZINES
Jack J. Gilbert, Suffern, N.Y., assignor to J. B. Anderson Co., Inc., Spring Valley, N.Y., a corporation of New York
Filed Aug. 17, 1964, Ser. No. 390,019
11 Claims. (Cl. 83—107)

The present invention relates to automatic machinery for cutting off and collecting parts of magazines, trade journals and other periodicals of similar physical makeup which are unsold, old issue and to get a credit for which the wholesale distributor must send these collected parts as evidence to his vendor.

The principal object of this invention is to provide a machine which, upon receiving a stack of such publications, will automatically cut off and collect the front cover page or just a part thereof from every magazine.

Another object thereof is to provide an automatic machine of the character described which is simple in construction, reasonable in cost, needs no attention while operating, other than the replenishment of the stack and which is efficient in carrying out the purposes for which it is designed.

Other objects and advantages will become apparent as this disclosure proceeds.

For one practice of this invention, the machine includes an elongated table having a slightly upwardly rearwardly inclined wall along its long back edge. On one end of said table there is a slightly downwardly rearwardly slanted support on which the magazines to be worked on are stacked on their backs with their front cover pages forward. The rearmost magazine of said stack rests against said wall and all the others are successively in contact with each other. A jogger means is associated with said support to maintain such condition.

There is a means to periodically shift the rearmost magazine out of the stack, a predetermined distance along said wall, towards the other end of the table where the moved magazine comes to rest whereupon an arm, carrying a vacuum-supplied suction cup operating for a prescribed interval, is brought against the front cover page and said arm is then moved so the cover page is swung downward towards the table next to a fixed guide element. Then there is a means to shift said magazine further towards the other end of the table along said wall. During such second movement, the cover page is brought to and held against the table by said guide element and then is cut off by a rotary blade. The cut off cover page comes up against a stop where it operates a micro-switch to close a circuit for actuating a means to move the cut off page towards the front of the table, during which movement said page is slit crosswise by another rotary blade. The upper part of such page then falls into a first bin and the other part falls into a second bin. While this is taking place, the remainder of the magazine continues to be moved along said wall and falls off the table into a third bin. The contents of the first bin constitute the parts to send to get a credit. The contents of the other bins are discarded.

When it is desired to collect only the entire front cover pages, then the second blade and the means to move the cover page past it are omitted.

As soon as the magazine worked on has cleared the vacuum cup station, the machine starts working on the magazine then rearmost in the stack and such cycle of operation continues until all magazines stacked on the machine are dealt with. Of course, the operator continuously adds to the stack until all the work to be done in the run is accomplished.

In the accompanying drawings forming part of this specification, similar characters of reference indicate corresponding parts in all the views.

FIG. 2 is a perspective view showing the table, the back wall and various parts of the machine including the stack of magazines thereon. In particular, the magazine worked on is shown at different positions along its path of travel to illustrate the mode of operation.

FIG. 3 is a perspective view showing the jogger mechanism which maintains the magazines in the stack in proper position.

FIG. 4 is a detail in section, showing one of the powered rollers used in mechanism to move the severed front cover page.

FIG. 5 is a diagrammatic showing of the driving means employed in this embodiment.

Figure 1:
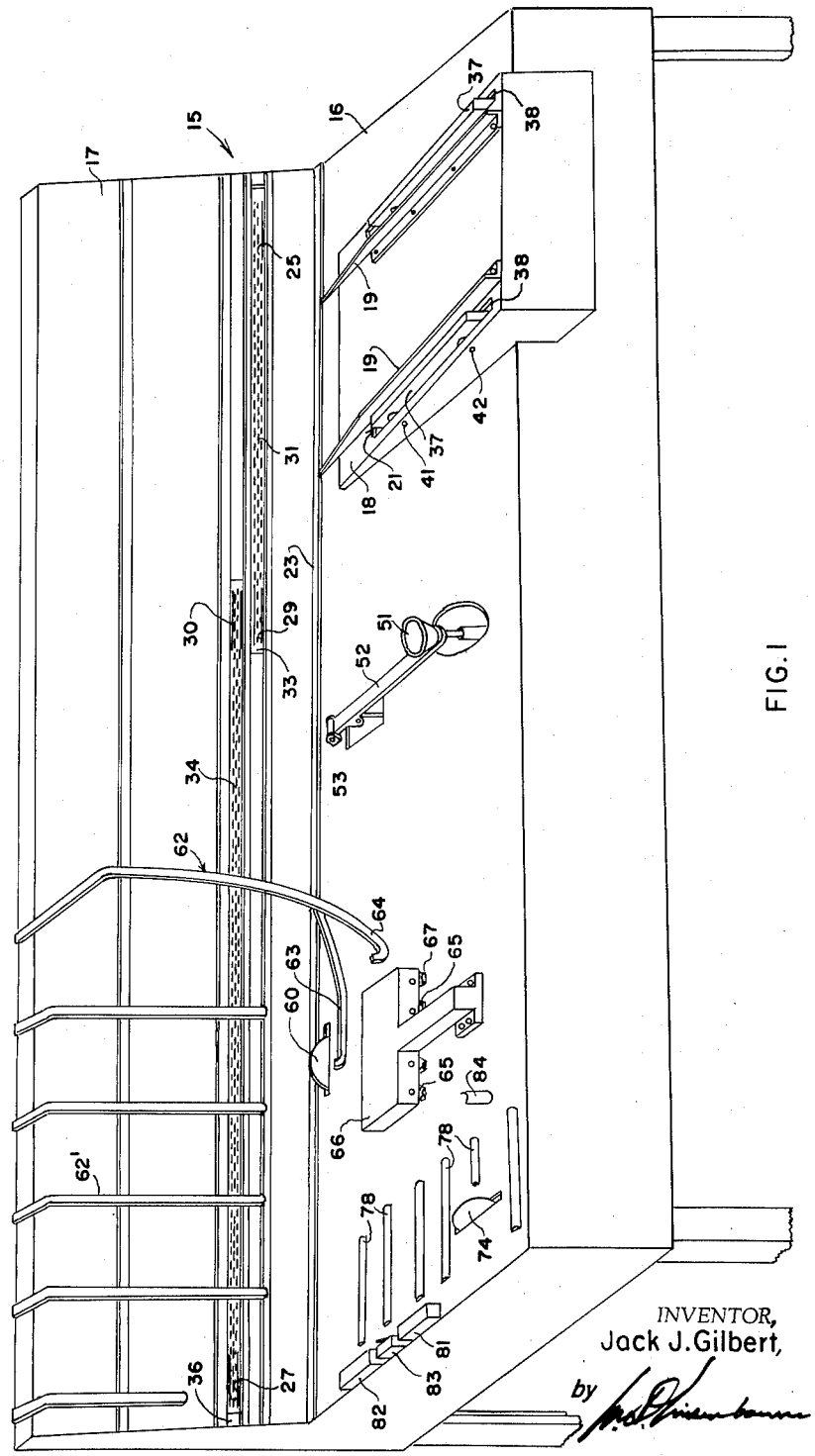
FIG. 1 is a perspective view of an automatic machine embodying the teachings of this invention.

In the drawings, the numeral 15 designates generally a machine which consists of an elongated table 16 having a slightly upwardly rearwardly inclined wall 17 along its long back edge. On one end of this table there is a slightly downwardly rearwardly slanted support indicated generally by the numeral 18 having the spaced rails 19 which extend to said wall. It is on these rails that magazines are stacked on their backs with their front cover pages forward as is shown at 20. A jogger means designated generally as 21 is associated with said stack support to maintain the rearmost magazine 22 against said wall 17 and all the others successively in contact with each other, so the stack is compact. Along the entire juncture of said table and wall is a strip 23 along which the rearmost magazine 22 will be moved standing on its back and leaning against said wall. Behind such wall 17, there are three journalled vertical shafts. The shaft 24 is at the stack-loading end of the machine and carries the sprocket 25. The shaft 26 is at the other end and carries the sprocket 27. The intermediate shaft 28 carries the two sprockets 29 and 30. The sprockets 25 and 29 are at the same level and engaged by an endless chain 31; said chain having a laterally extending finger 32 which in its travel extends through the horizontal opening 33 in the wall 17. The sprockets 30 and 27 are at a higher level and engaged by an endless chain 34 having a laterally extending finger 35 which in its travel extends through the horizontal opening 36 in said wall 17.

The jogger mechanism 21 may comprise two lengths of flat stock set horizontal with their flat faces vertical as shown at 37. These bars are positioned one alongside each of the rails 19 and extend through suitable openings 38 in the hollow support structure 18. Each of said bars has a pair of similar spaced identical round holes in which are rotatably mounted circular pieces 39, 40 which are identically eccentrically carried and secured on the shafts 41, 42 to serve as cams; the cams 39 being on the shaft 41 and the cams 40 being on the shaft 42. These shafts are connected to turn together and one of them is driven from the countershaft 43 which is powered by the main motor 44 of the machine 15. The numerals 45 and 46 indicate sprockets connected by the chain 47 and the numerals 48 and 49 designate sprockets connected by a chain 50. The direction of rotation of the shafts 41, 42 is such that when the bars 37 rise, they shall move towards the wall 17, thereby shifting the stack 20 towards said wall.

The numeral 51 designates a suction cup at the end of a bar 52 which is swingably mounted at 53 to the table 16 and the movement of said bar is effected by a solenoid 54 in a circuit including a micro-switch 55 and a timer 56. The suction cup 51 is supplied with vacuum and then connected to the atmosphere by a valve means 57 which is electrically controlled by a circuit including a micro-switch 58 and a timer 59. Said micro-switches may be operated by either of the fingers 32 or 35, but here they are arranged in the path of the finger 32 so that first the switch 55 is closed and then the switch 58. These manipulations cause the bar 52 to be swung upward for the suction cup 51 to reach the wall 17 and then vacuum is supplied to said cup.

The function of the suction cup 51 is to swing the cover page of the magazine which was last shifted out of the stack 20 by the finger 32; such movement of the cover page is downward upon downward movement of the arm 52. The numeral 60 denotes a rotatable disc blade driven by the motor 61, for severing the cover page. A guide denoted generally by the numeral 62, represents a finger 63 to hold the cover page against the table 16, while said cover page is being cut by the blade 60, and a second finger 64 which guides said page for transportation by a series of pinch rollers, the upper ones 65 of which are idlers journalled on the fixed frame 66, and the lower ones 67 of which are powered rollers journalled below the table and extending flush with the table's upper surface through suitable openings. As shown in FIG. 3, these rollers 67 are driven by a chain 68 which engages the sprockets 67' on such rollers respectively and a sprocket 69 on a journalled shaft 70, which in turn is driven by the system indicated generally by the numeral 71 from the main shaft 43.

The numeral 74 denotes a rotatable disc blade driven by the motor 75, for severing a strip off the top of the cover page, while such page is being transported to the front of the machine by the series of pinch rollers, the upper ones 76 of which are idlers journalled on a vertically movable frame 77, and the lower ones 78 of which are powered rollers journalled below the table and extending flush with the table's upper surface through suitable openings. As shown in FIG. 3, these rollers 78 are driven by a chain 79 which engages the sprockets 78' on such rollers 78 respectively and a sprocket 80 on the main shaft 43.

The axis of the disc blade 60 and the axes of the pinch rollers 65, 67 are horizontal, parallel and extend in a direction from the front to the back of the machine. The axis of the disc blade 74 and the axes of the pinch rollers 76, 78 are horizontal, parallel and extend in a direction from side to side of the machine. Said disc blade 60 is spaced from the back wall 17, a distance a bit greater than the maximum thickness of any magazine to be dealt with. The disc blade 74 is spaced a prescribed distance from the fixed stops 81, 82 on the table top, between which stops is the micro-switch 83. The frame 77 is normally in raised position, being supported by the spring-biased armature 84 of a solenoid 85, which solenoid when actuated, draws in its armature and thereby the frame 77 is lowered so the pinch rollers 76, 78 make contact. The arm 52 is normally in lowered position as shown in FIG. 1, but upon actuation of its solenoid 54, its spring-biased armature 56 is drawn in whereupon said arm is swung upward. Said solenoid 85 is in a circuit including the micro-switch 83 and a timer 73. The circuit of the solenoid 72 for operating the valve means 57, the individual circuits of the solenoids 54 and 85, and the individual motors 44, 61 and 75 are all powered from the main supply lines 100 in which is interposed the switch 101.

As shown in FIG. 3, the shaft 24 is driven from a shaft 87 by the meshed mitre gears 88 and 89; said shaft 87 being driven from the shaft 43 by a chain 90 engaged on the sprockets 91 and 92. The numerals 93 and 94 denote meshed mitre gears associating the shafts 70 and 95, which latter is driven from the shaft 43 by the chain 96 engaged on the sprockets 97 and 98. All sprockets are fixed on the respective shafts they are on. All shafts are journalled to "frame" except the shafts of the idler roller 76 which as mentioned, are on the frame 77. The arrows appearing along flights of chain in FIG. 3, indicate the respective directions of travel of such chain flights. The timers 56, 59 and 73 are of the well known commercial type which is in series with the switch they are in circuit with, permitting the circuit to close upon the closing of the switch, whereupon such timer is actuated to shunt the switch for a prescribed interval. Either the timer is set at the factory or it includes means to adjust such interval. Being well known, it is believed that further description thereof is not necessary for those versed in the machine arts.

Figure 6:
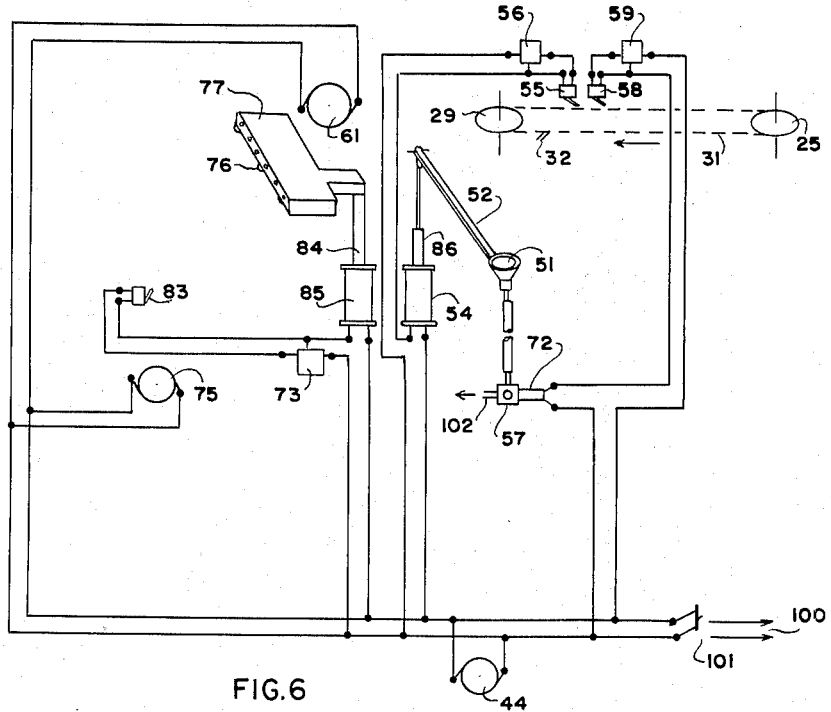
FIG. 6 is a diagram of the electrical circuit for mechanism contained in this machine.

The machine is at rest, when the switch 101 is open. The frame 77 is in raised position so the idlers 76 are away from the rollers 78. The arm 52 carrying the suction cup 51, is in its lowered position as in FIG. 1. Deem the chain 31 in the position shown in FIG. 6, so the switches 55 and 58 are open. The machine being bare, the switch 83 is in open condition.

To operate the machine 15, stack a load of magazines across the supports 19 as shown at 20 in FIG. 2, so they rest on their backs and have their front cover pages P facing forward. Connect a suction supply at 102. Close the switch 101 whereupon all the motors will run whereupon the disc blades 60 and 74 will rotate, ready to butt paper sent to them, all shafts will turn and so will the rollers 67 and 78. The jogger bars 37 will move, thereby acting on the stack 20 to shift all magazines toward the back wall 17 and the rearmost magazine 22 will rest against said wall and stand on the strip 23. Finger 32 will soon contact the magazine 22, shift it out of the stack 20 and bring it to the position of 22' in FIG. 2, where it will come to rest, for said finger will leave it and be along the rear flight of the chain 31. In its movement, said finger will now close the switch 56, thereby closing the circuit of the solenoid 54, which will cause the arm 52 to be swung upwardly and the suction cup will contact the front cover page P of the magazine at position 22'. Such contact will continue for a period of time as determined by the timer 56, which will soon be referred to again. Now the finger 32 will close the switch 58. This closes the circuit of the solenoid 72, whereupon the valve 57, which connected the cup 51 to atmosphere, will now operate to connect suction thereto and so the page P will become attached to said cup for a period of time determined by the timer 59. As soon as said page becomes so attached, the timer 56 will have run its time and open the circuit of the solenoid 54, whereupon the latter will be deactuated and so the arm 52 will be moved down to its normal rest position as shown in FIG. 1, causing the page P to be swung downward. Now the timer 59 will have run its time and open the circuit of the solenoid 72, causing the suction supply to be cut off from 102 by the resulting operation of the valve 57, which latter will now connect the cup 51 to atmosphere. This will release the page P from said cup, whereupon the finger 35 will engage the magazine at 22' and shift it towards the other end of the machine. During this latter movement of said magazine, its front page now indicated by P', will pass under the guide fingers 64 and 63, be propelled by the pinch rollers 65, 67 between which the page P' will pass, and be cut by the disc blade 60, whereby the cover page will be cut off and pass onto the rollers 78 and contact the stops 81, 82 and close the switch 83 to actuate the solenoid 85, whereupon the frame 77 will descend and said cover page will be transported by the operating nipping rollers 78, 76 past the disc blade 74, to have the strip S cut off therefrom. Said strip S will fall into the compartment 103 of the bin 104, while the rest of said page, indicated by B will fall into the compartment 105 of said bin 104. While this happens, the rest of the magazine 22' which moves behind the fixed guides 62', will be shifted by the finger 35, off the machine and into the bin 106. As is evident, the slips in the compartment 103 are saved.

As soon as the strip S has been cut off, the time of the timer 73 has run out, so the circuit of the solenoid 85 will be opened, thereby causing the frame 77 to return to its raised position; all solenoids being spring-loaded to return to normal rest position.

The speed of the shaft 24 driving the chains 31, 34 is such that, avoiding clash with the magazine being worked on, the magazine now occupying the rearmost position in the stack 20, is met by the finger 32, and so the operation is repeated ad infinitum; the stack being replenished as the machine runs, with one kind of magazine. Before any change is made in this respect, the strips S are collected from the bin compartment 103.

In instances where the whole of the cover page is to be collected, the cutter 74 is omitted, and if the machine is to be built only for such purpose, all mechanism shown in FIG. 1 to the left of the frame 66 is not needed and so the severed cover page, by an addition of pinch rollers (not shown) to the left of the series 65, 67, may be made to fall in a bin (not shown) at the end of the table, which is believed evident without further illustration.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description and showing herein to indicate the scope of this invention.

I claim:

1. In a machine of the character described, the combination of a table presenting a straight path for a magazine to be moved thereon from one end of said table towards and off the other end of said table, means for moving a magazine along said path and off the other end of said table, means to swing an outer page of said magazine to lie in face contact with the table before the magazine has reached the other end of said table, cutting means intermediate said page-swinging means and the other end of the table, in the path of said swung page, adapted to sever said page while the magazine is being moved and is approching said other end of the table, means to move the severed page off the table, a stop means at the other end of said table, for intercepting said severed page; said means for moving the severed page off the table, moving said page on the table, in a direction perpendicular to said path and a second cutting means positioned intermediate the position of said severed page when it is against said stop and the place on the table where such severed page leaves the table, whereby the severed page is cut by said second cutting means into two parts.

2. In a machine of the character described, the combination of a table, an upwardly extending wall along the rear edge of the table, adapted to be contacted by the back page of a magazine standing on its back on the table, a support on and near one end of the table, for holding a stack of magazines resting on their backs thereon; said backs extending along said wall with the rearmost magazine of the stack against said wall, a jogger means positioned at said support, for biasing said stack towards said wall, means for operating said jogger, a first means mounted for movement to and fro along said wall, for shifting the rearmost magazine on said support, out of the stack and along said wall in a direction towards the other end of the table to a predetermined station, a means at said station, operable for engaging and swinging the front page of said shifted magazine downwardly onto the table, means to release said engagement, a second means mounted for movement to and fro along said wall, for moving said shifted magazine along said wall from said station, towards and off said other end of the table, a cutting means at a predetermined distance from the front of said wall, between said station and said other end of the table, for severing said page which is on the table during movement of said magazine from said station, guide means to hold said page against the table while said page is being severed by said cutting means, means for moving said severed page off the table and means to operate said first and second means and said page-engaging, swinging and releasing means in a predetermined timed relation whereby said magazine starts moving away from said station after said page is swung down to the table and released.

3. A machine as defined in claim 2, including a stop means at the other end of said table, for intercepting said severed page; said means for moving the severed page off the table, moving said page on the table, in a direction perpendicular to said path and a second cutting means positioned intermediate the position of said severed page when it is against said stop and the place on the table where such severed page leaves the table, whereby the severed page is cut by said second cutting means into two parts.

4. A machine as defined in claim 2, wherein each of the first and second magazine shifting means comprises a pair of spaced sprockets positioned behind said wall and mounted on vertical shafts; each said pair of sprockets being engaged by individual endless chains; said chains being along said wall; each of said chains having a horizontal finger extending therefrom; said wall having elongated horizontal slots; each of said fingers, during the movement of said chains, extending through one of said slots respectively and are adapted to engage that edge of a magazine which is nearest the said one end of the table; the path of movement of the tip of the finger on the chain of the first means when through the slot it passes, being from near said one end of the table to said station and the path of movement of the tip of the finger of the chain of the second means when through the slot it passes, being from said station to said other end of the table and means to turn said sprockets.

5. A machine as defined in claim 4, wherein at least one of said fingers are included in the means which operates said page-engaging, swing and releasing means in said timed relation.

6. A machine as defined in claim 2, wherein the page-engaging and swinging means includes an arm extending forwardly from said wall; said arm being pivoted to the table, at its rearward end whereby said arm is swingable upwardly towards said wall, a cup carried on the other end of said arm whereby the mouth of said cup contacts said page when arm is swung upwardly to the wall, a suction supply, a valve connected to direct said suction supply to said cup; said valve being normally in a condition whereby it connects said cup to the atmosphere and capable of being operated to assume a condition to direct only the suction supply to said cup; said page-releasing means including means to return said valve to its said normal condition.

7. A machine as defined in claim 2, wherein said stack support extends upwardly forwardly from said wall.

8. A machine as defined in claim 2, wherein said wall slants upwardly rearwardly from the table, near to vertical.

9. In a machine of the character described, the combination of a table, an upwardly extending wall along the rear edge of the table, adapted to be contacted by the back page of a magazine standing on its back on the table, a support on and near one end of the table, for holding a stack of magazines resting on their backs thereon; said backs extending along said wall with the rearmost magazine of the stack against said wall, a jogger means positioned at said support, for biasing said stack towards said wall, means for operating said jogger, a first means mounted for movement along said wall, for shifting the rearmost magazine on said support, out of the stack and along said wall in a direction towards the other end of the table to a predetermined station, a second means mounted for movement along said wall, for moving the shifted magazine along said wall from said station, towards and off said other end of the table, each of said first and second means comprising a pair of spaced sprockets positioned behind said wall and mounted on vertical shafts; each of said pair of sprockets being engaged by individual endless chains; said chains being along said wall; each of said chains having a horizontal finger extending therefrom; said wall having elongated slots therealong; each of said fingers, during the movement of said chains, extending through one of said slots respectively and are adapted to engage that edge of a magazine which is nearest to said one end of the table; the path of movement of the tip of the finger on the chain of the first means when through the slot it passes, being from near said one end of the table to said station and the path of movement of the tip of the finger of the chain of the second means when through the slot it passes, being from said station to the other end of the table, means to turn said sprockets, an arm extending forwardly from said wall at said station; said arm being pivoted to said table, at its rearward end whereby said arm is swingable towards said wall, a solenoid operatively associated with said arm whereby when said solenoid is actuated, said arm will be swung upward and when deactuated, said arm will be swung downward to a normal rest position, a cup carried on the other end of said arm whereby the mouth of said cup contacts said page when said arm is swung upwardly to the wall, a suction supply, a valve normally connecting said cup to the atmosphere, a second solenoid operatively associated with said valve whereby when said second solenoid is actuated, a connection will be effected to make said valve direct only the suction supply to said cup and when deactuated, said valve will again assume the condition where it connects said cup to the atmosphere only, a first circuit for actuating the first solenoid, controlled by a first switch and a first timer, a second circuit for actuating the second solenoid, controlled by a second switch and a second timer; each of said switches being in the path of a finger which is on said chains and adapted to be operated to be closed by the finger which passes it; said switches being positioned so that the first switch is closed before the second switch is closed; each of said timers determining the period of time the circuits they are in remain closed, a cutting means at a predetermined distance from the front of said wall, between said station and said other end of the table, for severing said page which is on the table, during movement of said magazine from said station, guide means to hold said page against the table while said page is being severed by said cutting means and means for moving said severed page off the table.

10. A machine as defined in claim 9, including a stop means at said other end of the table, for intercepting said severed page; said means for moving the severed page off the table, moving said page on the table, in a direction perpendicular to the line of movement of the magazine and a second cutting means positioned intermediate the position of said severed page when it is against said stop and the place on the table where such severed page leaves the table, whereby the severed page is cut by said second cutting means into two parts.

11. A machine as defined in claim 9, wherein said stack support extends upwardly forwardly from said wall and said wall slants upwardly rearwardly from the table, near to vertical.

References Cited by the Examiner

UNITED STATES PATENTS

| | | | |
|---|---|---|---|
| 2,584,346 | 2/1952 | Havely | 83—110 |
| 2,618,334 | 11/1952 | Cobb | 83—167 X |

WILLIAM W. DYER, JR., *Primary Examiner.*

J. M. MEISTER, *Assistant Examiner.*